(No Model.)

R. J. FLINN.
STEAM TRAP.

No. 514,883. Patented Feb. 13, 1894.

WITNESSES:
Mc.W. Jackson.
A. D. Harrison.

INVENTOR:
R. J. Flinn
by Wright Brown
Crosby
Attys.

THE NATIONAL LITHOGRAPHING COMPANY,
WASHINGTON, D. C.

UNITED STATES PATENT OFFICE.

RICHARD J. FLINN, OF BOSTON, MASSACHUSETTS, ASSIGNOR OF ONE-HALF TO EDWIN R. COBURN, OF SAME PLACE.

STEAM-TRAP.

SPECIFICATION forming part of Letters Patent No. 514,883, dated February 13, 1894.

Application filed March 19, 1892. Serial No. 425,552. (No model.)

*To all whom it may concern:*

Be it known that I, RICHARD J. FLINN, of Boston, in the county of Suffolk and State of Massachusetts, have invented certain new and useful Improvements in Steam-Traps, of which the following is a specification.

This invention has for its object to provide a steam trap of simple and durable construction, free from the features which render many of the familiar types of steam traps objectionable, such features, for example, being floats or buckets and expansion devices, my improved trap being destitute of any device such as a float or bucket or any expansion device, and being governed by variations of pressure on a flexible diaphragm which controls a valve.

The invention consists in the several improvements which I will now proceed to describe and claim.

Figure 1:
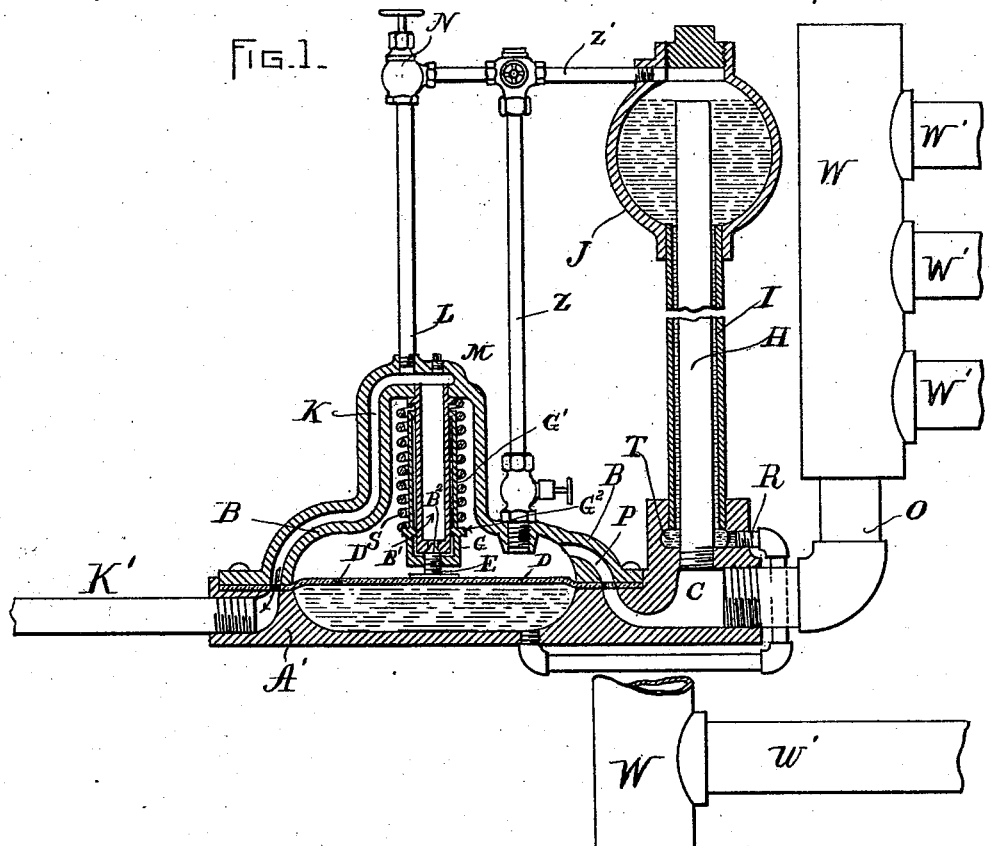
Figure 2:
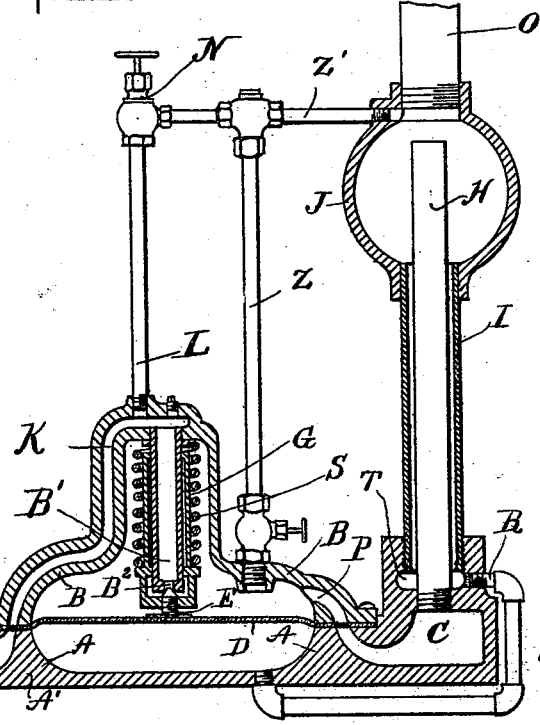

Of the accompanying drawings, forming part of this specification: Figure 1 represents a vertical section of a steam trap embodying my invention. Fig. 2 represents a vertical section showing certain differences in the manner of operating the trap, the essential features being the same as in Fig. 1.

The same letters of reference indicate the same parts in both the figures.

In the drawings: A represents a water chamber, formed in a supporting base or casing A'. One side of said chamber is formed by a flexible diaphragm D, which may be of rubber or any other suitable material, the diaphragm having preferably a considerable area. At the opposite side of the diaphragm D is a chamber B, the two chambers being entirely separated by the diaphragm, which constitutes the bottom of one chamber and the top of the other. The chamber B is provided with an outlet tube or passage B', which is preferably, although not necessarily, arranged as shown in the drawings; that is to say, it is a tube, attached at its upper end to the wall of the chamber B, and projecting downwardly therefrom, its lower end having an opening $B^2$. The upper end of the outlet or tube B' communicates with a passage K in the casing, which passage communicates with a waste pipe K'.

E represents a valve, which is adapted to rest upon the diaphragm D, and also to close the outlet opening $B^2$. Said valve is here shown as attached to a yoke G, which is formed on a tubular frame or slide G', fitted to move upon the outlet tube B'. The slide G' is provided at its lower end with a flange $G^2$, on which bears one end of a helical spring S, the other end of which bears on a fixed seat on the casing, or elsewhere. The spring S normally presses the valve E away from its seat, so that, when the pressure in the chamber A is reduced, as hereinafter described, the valve is normally opened, and permits the escape of water from the chamber B to the waste pipe K', the diaphragm D supporting the valve E and holding it against its seat under certain conditions, as presently described.

P represents a passage or port, which admits water into the chamber B. Said passage communicates with a chamber C, formed in the casing A', said chamber also communicating with a vertical stand pipe H, which rises to a considerable height above the level of the diaphragm D, and is open at its upper end, said upper end being located in a condensing chamber or reservoir J.

I represents a vertical pipe, which communicates at its upper end with the reservoir J, and at its lower end with the chamber A below the diaphragm. For convenience, I have shown the pipe I as surrounding the stand pipe H and separated therefrom by an annular space, but said pipes may be otherwise arranged, if preferred. The communication between the lower end of the pipe I and chamber A is here shown as effected by means of a port T, formed in the casing, and a pipe R, connecting said port with the chamber A, said pipe being chosen for the sake of clearness of illustration, although in practice I prefer to connect the port T with the chamber A by a passage or port formed within the body of the casing.

W' W' represent a series of heating pipes, and W a head or connection communicating with said pipes. In the construction shown in Fig. 1, I show the head W connected by a pipe O with the chamber C in the casing, this being a convenient arrangement where the vertical space is limited.

In Fig. 2, I show an arrangement which may be adopted where there is sufficient vertical space for the location of the trap below the steam pipes, the connecting pipe O being, in the construction shown in Fig. 1, connected with the upper portion of the condensation chamber or reservoir J.

Operation: For the purpose of describing the operation of the steam trap, when connected with the steam pipes in the manner shown in Fig. 1, let it be supposed that the area of the diaphragm D is equal to twenty-eight (28) square inches, that the spring S exerts a downward pressure of fourteen (14) pounds on the diaphragm, that the vertical distance from the diaphragm to top of stand pipe H is equal to twenty-seven (27) inches, and that the shell A and pipes R and I are filled with water up to the level of top of pipe H. The column of water in pipe I presses on the under side of the diaphragm D with a force equal to one (1) pound per square inch or twenty-eight (28) pounds on the whole area of the diaphragm; consequently the diaphragm is forced upward against the counter-pressure of the spring S, and holds the valve E to its seat with a net force of fourteen (14) pounds. The chamber J is made of considerable capacity in order that the movement of the diaphragm will not materially affect the height of the water column in pipe I. Steam being admitted to the heating pipes W, the water of condensation and the steam flow into and fill shell B. The steam, meanwhile, has free access through pipe H to the interior of chamber J, and presses with the same force on the surface of the water contained in it as it does on the water in shell B, but the pressure on the under side of the diaphragm is greater than on the upper side of the diaphragm (because of the head of water in pipe I) in the same proportion that it was before steam was admitted. The water of condensation accumulates in pipe O until it reaches the level of the bottom of pipe H, thereby shutting the steam off from pipe H and chamber J,—in other words, forming a water seal. The steam which remained in pipe H and chamber J immediately begins to condense and fall in pressure, and as condensation goes on, the water rises in pipe H, because of the decreasing pressure in the upper portion of said pipe. The upward pressure exerted on the under side of the diaphragm therefore commences to decrease when the lower end of the pipe H is sealed, said pressure gradually decreasing until it becomes less than the combined downward pressure of the steam and the valve spring and permits the opening of the valve. When the water has risen to a point midway of the length of the pipe, or thirteen and one half (13½) inches, measuring upward from the level of the diaphragm, the steam pressure (as indicated in my experiments by a steam gage on top of chamber J and a gage glass on pipe H) has fallen one half (½) pound per square inch below the upward pressure on the diaphragm D. This is evident, as it requires a pressure of one-half (½) pound per square inch to support a column of water thirteen and one-half (13½) inches in height. Assuming that there is a constant steam pressure of ten (10) pounds on the heating pipes, the pressure now on the under side of the diaphragm is ten and one-half (10½) pounds per square inch (nine and one-half pounds steam pressure and one pound water pressure), and the pressure on the upper side is ten and one-half (10½) pounds per square inch (ten pounds steam pressure and one-half pound spring pressure). The area upon which pressure acts is greater on the lower surface of the diaphragm than on the upper surface, to the amount of the area of the opening covered by the valve E, when said valve E is closed; therefore, the valve remains closed until the pressure on the greater area of lower surface of the diaphragm becomes less than the pressure on the smaller area of the upper surface, when the valve opens and allows the water to escape through port K. When the water in pipe O falls below the level of bottom of pipe H, steam enters chamber C, and, as it is of a greater pressure than the steam in the upper part of chamber J, it flows up through the water in pipe H and equalizes the pressure in chambers J and C, the water in pipe H having meanwhile fallen into chamber C and space above diaphragm. The pressure now in chamber J, acting on the surface of the contained water and on the under side of the diaphragm, raises the diaphragm and closes the valve E. This action is repeated at such short intervals that the flow of water is practically constant, as I have demonstrated by experiment.

When the apparatus is arranged as shown in Fig. 2, the pipe O being connected with the upper portion of the reservoir J, the steam and water of condensation enter the said reservoir directly, and pass downwardly through the stand-pipe H, chamber C and port P to the chamber B, the pipe I and reservoir J being full of water to the level of the top of stand-pipe H, as before. As the water of condensation accumulates, it fills the chamber B and rises in the stand-pipe H. Before the water attains any considerable height in the pipe H, the steam pressure is practically the same on both sides of the diaphragm, so that the latter is subjected to an upward pressure of eleven (11) pounds per square inch (ten pounds steam and one pound water) and a downward pressure of ten and one-half (10½) pounds (ten pounds steam and one-half pound spring), so that the valve remains closed. As the water rises in the pipe H, the pressure due to the height of the column of water in said pipe is added to the steam pressure on the upper surface of the diaphragm, said water pressure reaching one-half (½) pound per square inch when the pipe H is half full of water, or when the column of water in said pipe is thirteen and one-half (13½) inches above the level of the diaphragm; so that the upward and downward pressures on the diaphragm are balanced. Any further increase in the height of water in the stand-pipe H therefore causes the depression of the diaphragm and the opening of the valve. The ensuing escape of water then decreases the downward pressure on the diaphragm until the valve is closed, and thus the operation continues, the valve alternately opening and closing; but, as in the operation of the apparatus as first described, the action is repeated at such short intervals that the flow of water is practically continuous.

I have shown at L a blow-off pipe connected with the upper portion of the passage K, said pipe having a blow-off cock N.

Z represents a glass gage tube, connected with the chamber B, and with a tube Z' communicating with the upper portion of the reservoir J.

My invention is not limited to the particular arrangement and construction of parts here shown, and the same may be variously modified without departing from the spirit of the invention.

Some of the advantages of this trap are as follows: First. Its action is not affected by short quick vibrations, such as occur on steam cars, where float or bucket traps will not work on account of such vibrations. Second. It can be connected close to the heating pipes, and will take away the water of condensation as fast as formed, regardless of the temperature of the water, or variation of pressure in heating pipes, a result that cannot be produced by expansion traps. Third. It is considerably smaller and lighter than float and bucket traps of the same capacity. Fourth. Its capacity can be increased indefinitely by enlarging valve E and increasing height of pipes H and I. This increase in capacity can be obtained at a less cost than in other traps.

It is obvious that any other suitable means for maintaining a constant pressure on the diaphragm may be substituted for the spring S, such, for example, as a weight.

I do not limit myself to the direct connection of the diaphragm with the valve or device which is operated by the fluctuations thereof, as said valve may be located outside of the casing and operated through suitable connections with the diaphragm passing through the casing.

A distinguishing characteristic of my invention is the combination of a diaphragm or partition constantly pressed in one direction, and connections between the opposite sides of said diaphragm or partition and a source of steam supply, one of said connections including a stand-pipe adapted to contain a column of water, which, when the steam pressure is equal on both sides of the diaphragm, overcomes the said constant pressure. I believe myself to be the first to organize an apparatus of this kind having the features just mentioned, the arrangement being such that an accumulation of water of condensation causes an increase of pressure on the constantly pressed side of the diaphragm, while a falling off of the quantity of water of condensation causes a decrease of pressure on the said constantly pressed side. It is obvious that this principle may be applied to many different kinds of apparatus, such, for example, as pressure regulators, damper regulators, pump governors, &c.

I claim—

1. The combination of two chambers separated by a partition or diaphragm adapted to be moved by variations of pressure; a pressure device such as a spring, arranged to exert a constant pressure on one side of said partition; connections between said chambers and a source of steam supply, whereby steam and water of condensation from said source may be admitted to both sides of the diaphragm, said connections including a condensing chamber or reservoir, located above the level of the partition, and conduits connecting said reservoir and the two chambers, said reservoir and one of said conduits being adapted to contain a column of water, which, with the steam pressure equal in the two chambers, overcomes the constant pressure on the diaphragm, the arrangement being such that an accumulation of water of condensation in the conduit connecting the reservoir with the constantly pressed side of the partition causes a variation of pressure on one side of the partition; and a device, such as a valve, operated by fluctuations of the partition; as set forth.

2. The combination of two chambers, separated by a movable partition or diaphragm; a pressure device, such as a spring, arranged to exert a constant pressure on one side of said partition; a condensing chamber or reservoir, elevated above said partition; a stand-pipe, communicating at its upper end with said reservoir, and at its lower end with the constantly pressed side of the partition; another stand-pipe, communicating at its lower end with the opposite side of the partition, and at its upper end with the reservoir; and an inlet for steam and water of condensation, the arrangement being such that, before the accumulation of water of condensation in the apparatus, the steam pressure is equal on both sides of the partition, and the water in one of said stand-pipes, aided by the steam pressure, overcomes the constant pressure on the partition, while an accumulation of water causes a variation of pressure on one side of the partition; as set forth.

3. The combination of two chambers, separated by a movable partition or diaphragm; a pressure device, such as a spring, arranged to exert a constant pressure on one side of said partition; a condensing chamber or reservoir, elevated above said partition; a stand-pipe, communicating at its upper end with said reservoir and at its lower end with the constantly pressed side of the partition; another stand-pipe, communicating at its lower end with the opposite side of the partition, and at its upper end with the reservoir; a chamber at the base of one of said stand-pipes, said chamber communicating with the chamber at the constantly pressed side of the partition; and an inlet for steam and water of condensation, communicating with said chamber, the arrangement being such that, when said chamber is open to receive steam, there is a uniform steam pressure on both sides of the partition, and, when the water of condensation accumulates in said chamber, it shuts off he direct steam pressure from one side of the diaphragm and reduces the pressure thereat; as set forth.

In testimony whereof I have signed my name to this specification, in the presence of two subscribing witnesses, this 5th day of March, A. D. 1892.

RICHARD J. FLINN.

Witnesses:
C. F. BROWN,
A. D. HARRISON.